W. MAYER.
TILTING AMMUNITION VEHICLE.
APPLICATION FILED FEB. 19, 1908.

911,830.

Patented Feb. 9, 1909.

2 SHEETS—SHEET 1.

W. MAYER.
TILTING AMMUNITION VEHICLE.
APPLICATION FILED FEB. 19, 1908.
911,830.
Patented Feb. 9, 1909.
2 SHEETS—SHEET 2.
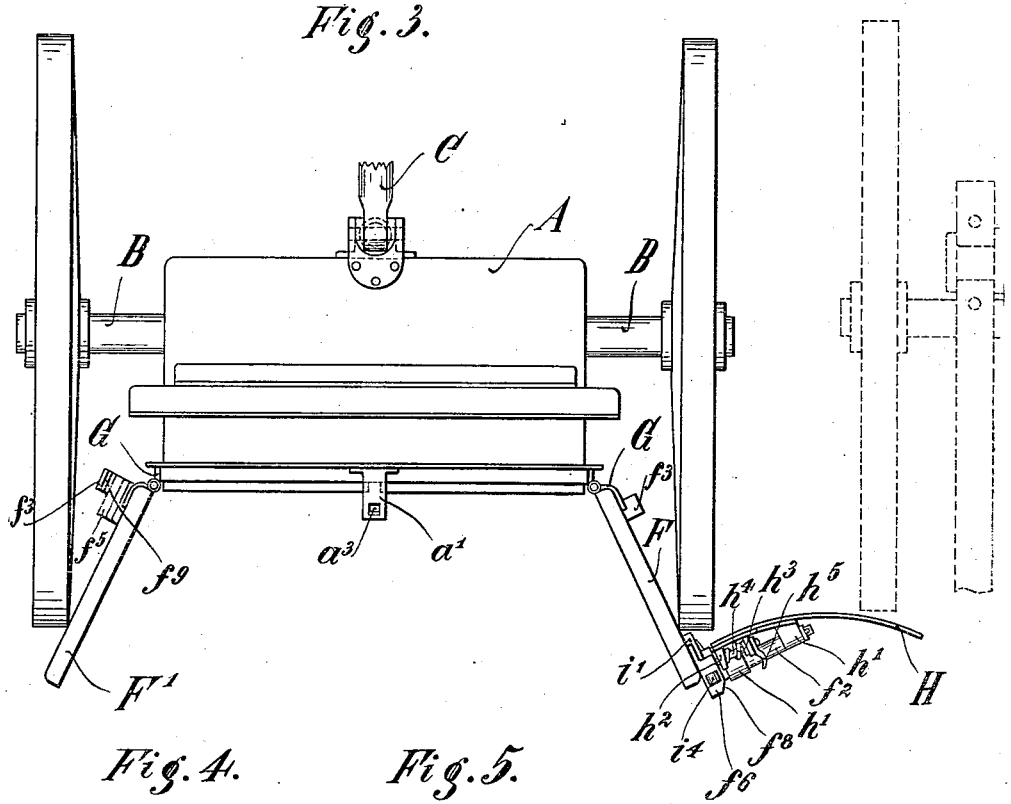
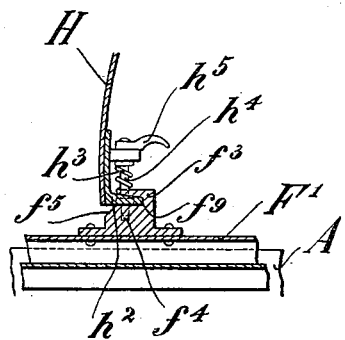
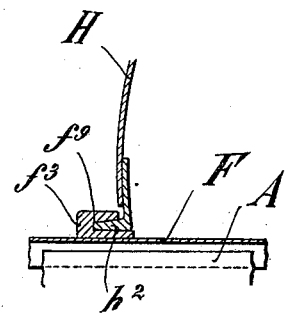
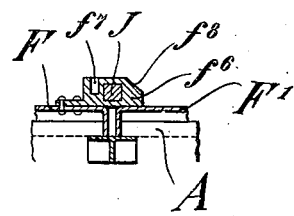
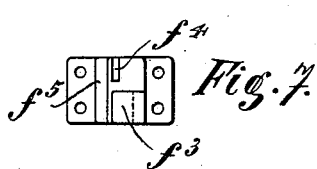
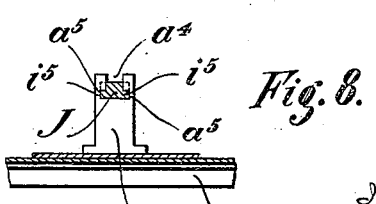

UNITED STATES PATENT OFFICE.

WILHELM MAYER, OF ESSEN-ON-THE-RUHR, GERMANY, ASSIGNOR TO FRIED. KRUPP AKTIENGESELLSCHAFT, OF ESSEN-ON-THE-RUHR, GERMANY.

TILTING AMMUNITION-VEHICLE.

No. 911,830.     Specification of Letters Patent.     Patented Feb. 9, 1909.

Application filed February 19, 1908. Serial No. 416,678.

*To all whom it may concern:*

Be it known that I, WILHELM MAYER, a subject of the Emperor of Germany, and a resident of Essen-on-the-Ruhr, Germany, have invented certain new and useful Improvements in Tilting Ammunition-Vehicles, of which the following is a specification.

The present invention relates to a tilting ammunition vehicle which is provided with a protecting shield. The shield is swingingly mounted on the door of the wagon box in such a manner that, when the door is closed, the shield can form the back of the seat for the serving crew and, when the door is open and the wagon is tilted, the shield can enlarge the space covered by the wagon.

The accompanying drawings show the invention applied to a tilting ammunition wagon by way of example.

Figure 1:
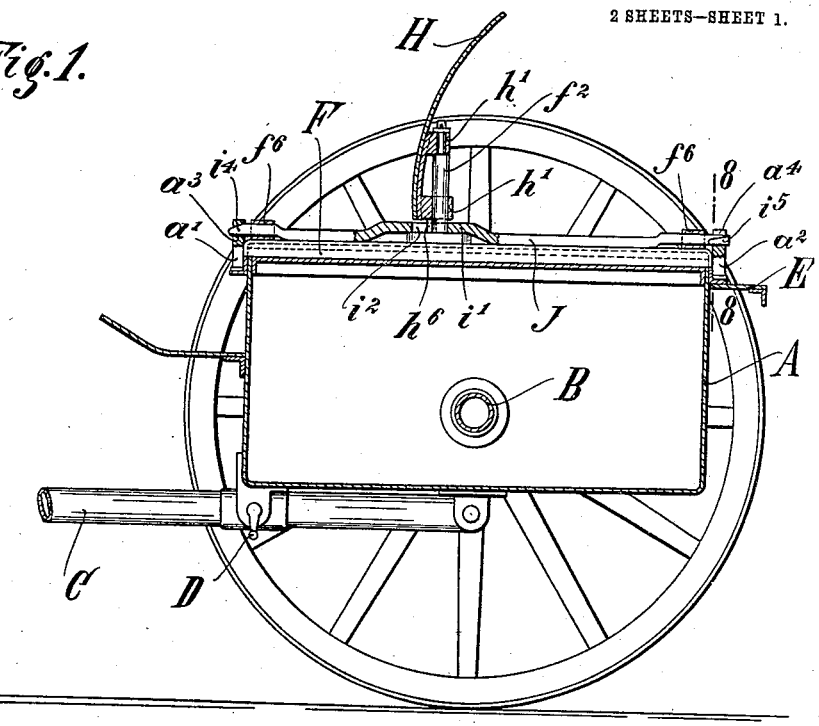
Figure 2:
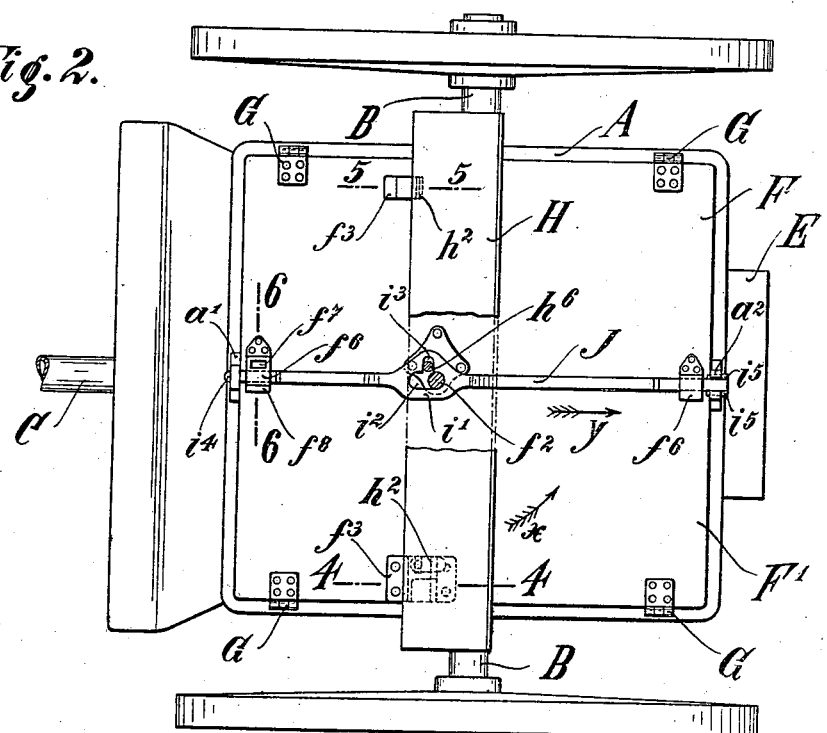

Figure 1 is a longitudinal section through the ammunition wagon in the traveling position, Fig. 2 is the corresponding top view, and Fig. 3 is a top view of the wagon in the tilted position, the gun being shown in dotted lines. Figs. 4 to 8 show some details on an enlarged scale, Fig. 4 being a section on line 4—4, Fig. 2, looking from the side, Fig. 5 being a section on line 5—5, Fig. 2, looking from the side, Fig. 6 being a section on line 6—6, Fig. 2, looking from the left, Fig. 7 being a top view of a part of Fig. 4, and Fig. 8 being a section on line 8—8, Fig. 1, looking from the left.

A indicates the wagon box which serves for holding the ammunition and through which the wheel axle B projects. The pole C is jointed to the bottom wall of the wagon box and can be firmly connected thereto by means of a key bolt D (Fig. 1).

E is a foot by means of which the wagon box A can rest on the ground when the wagon is in the tilted position. The wagon box is provided with a door having its leaves F and F′ connected to the side walls of the wagon box by means of hinges G.

The front part of the door-leaves F and F′ forms the bottom of the seat for the serving crew and is covered with cushions (not shown in the drawings) during the travel. A protecting shield H serves as back for the seat. Through the medium of a pintle $f^2$ (Figs. 1 to 3) arranged on the door-leaf F and two bearing-eyes $h'$ (Figs. 1 and 3) the shield is connected to the leaf F in such a manner that it can be swung about an axis at right angles to the upper surface of the closed door. On the lower edge of the shield H two stops $h^2$ are provided (see especially Figs. 4 and 5) and corresponding stops $f^3$ (see especially Figs. 4, 5 and 7) are provided on the door-leaves F F′. The stops $f^3$ are provided with a notch $f^9$ for the corresponding stop $h^2$. In that position of the protecting shield, in which the shield forms the back of the seat for the serving crew (Figs. 1 and 2), the stops $h^2$ engage the notch $f^9$ of the stops $f^3$. In this position, the stops $h^2$ $f^3$ prevent the shield from turning in the direction of the arrow $x$ (Fig. 2) while they permit a turning in the opposite direction. When the stops engage with each other in the manner shown in the drawings, they can also relieve the pintle $f^2$ and its bearings $h'$ from the shocks exerted on the shield during the travel and from the pressure exerced by the crew leaning aginst the protecting shield H. In one of the stops $h^2$ is slidably mounted a bolt $h^4$ (Figs. 3 and 4) which is under the action of a spring $h^3$ and is provided with a handle $h^5$. When the protecting shield is in the position shown in Figs. 1 and 2, the bolt $h^4$ engages in a notch $f^4$ (Figs. 4 and 7) in the corresponding stop $f^3$ and the shield is then also secured against turning in the direction opposite to the arrow $x$. An inclined face $f^5$ on the stop $f^3$ carrying the bolt $h^4$ serves the purpose of coöperating with the bolt $h^4$ in a manner to be presently described. In the door-leaf F a locking rod J is mounted in such a manner that it can be moved in the longitudinal direction of the door-leaf. The rod J is guided by two guide-pieces $f^6$ which are secured on the leaf F and which overlap the other leaf when the door is closed (see also Fig. 6). A pair of locking pieces $a'$ and $a^2$ are secured on the front wall and rear wall of the wagon-box A. The end $i^4$ of the locking rod J is wedge-shaped and serves for engagement in a recess $a^3$ in the locking piece $a'$. The other end of the locking rod has two lateral, wedge-shaped projections $i^5$ (see also Fig. 8) which can enter into engagement with undercuts $a^5$ (Fig. 8) in a recess $a^4$ provided in the locking piece $a^2$ for the rod J. By reason of this arrangement, the projections $i^5$ pass out of engagement with the locking piece $a^2$ when the rod J is moved to a slight extent from the locking position (see Figs. 1 and 2) in the direction of the arrow $y$ (Fig. 2) and at the same time the end $i^4$ of the rod passes out of the locking piece $a'$. It is true that the rod J still lies in the recess $a^4$ but the door F F' can be opened as the recess $a^4$ is open in the direction in which the rod moves when the door-leaf F is opened. The rod J is enlarged near its central portion (Fig. 2) and the enlarged portion $i'$ of the rod is provided with a slot $i^2$ for the pintle $f^2$ and a slot $i^3$ for a pintle $h^6$, which latter is mounted on one of the bearing-eyes $h'$ of the shield. The slot $i^3$ extends transversely to the longitudinal direction of the rod J so that a longitudinal movement of the locking rod takes place when the shield is turned about the pintle $f^2$. By reason of the relative arrangement of the pintle $h^6$ and the slot $i^3$ the locking rod J is in the locking position when the shield is in the position shown in Figs. 1 and 2; however, if the shield is turned 90° from this position in the direction opposite to the arrow $x$ the locking rod J moves in the direction of the arrow $y$ to such an extent that the locking connection between the door F F' and the wagon-box A is released.

One of the guide-pieces $f^6$ is provided with a notch $f^7$ (Figs. 2 and 6), into which the bolt $h^4$ can pass when the turning movement just mentioned is imparted to the shield. In a manner similar to one of the stops $f^3$ that guide-piece $f^6$ which has the notch $f^7$ is provided with an inclined face $f^8$ which serves to coöperate with the bolt $h^4$.

In the traveling position of the ammunition wagon, the several parts assume the positions mainly shown in Figs. 1 and 2. The wagon-box is closed by the door F F' and the protecting shield is in the position in which it forms the back of the seat for the serving crew. The locking pieces $h^2$ engage in the notch $f^9$ of the locking pieces $f^3$ and the locking rod J locks the door. Furthermore, the bolt $h^4$ rests in the notch $f^4$ under the pressure of the spring $h^3$. In this position, the protecting shield is, therefore, immovably connected to the wagon-box.

When it is desired to bring the wagon into the tilted position and the wagon has been placed adjacent to the appertaining gun and has been unlimbered, the key-bolt D is first removed and the wagon-box is then tilted rearwardly to such an extent that its foot E comes to rest on the ground. At the same time the pole C swings downwardly to have its forward end resting on the ground. The operator then grasps the handle $h^5$ and pulls the bolt $h^4$ out of the notch $f^4$ against the action of the spring $h^3$ and he then turns the protecting shield about the pintle $f^2$ in the opposite direction of the arrow $x$. When the shield has been turned almost 90° the bolt $h^4$, which is again released at the start of the turning movement of the shield, hits the inclined face $f^3$ of one of the guide-pieces $f^6$, and when the shield is turned further the bolt $h^4$ enters automatically into engagement with the notch $f^7$ of the said guide-piece. The shield is then secured relatively to the door-leaf F in the position shown in Fig. 3. Through the turning movement of the shield about the pintle $f^2$ the locking rod has been moved in the direction of the arrow $y$, whereby the locking connection between the door and the wagon-box is released. When the door is now opened, the protecting shield H enlarges the space covered by the wagon-box A and the door-leaves F F' in such a manner that the gap between the ammunition wagon and the gun is covered, as shown in Fig. 3.

When it is desired to return the shield to its original position, the door is first closed. The bolt $h^4$ is thereupon drawn out of the notch $f^7$ of the corresponding guide-piece $f^6$ and the shield is turned in the direction of the arrow $x$. When the shield has been turned almost 90°, the bolt $h^4$ hits the inclined face $f^5$ of the corresponding stop $f^3$ and, when the shield is turned further, the bolt $h^4$ automatically enters into engagement with the notch $f^4$ of the stop. Simultaneously herewith the locking rod has again reached the position in which it locks the door.

Having thus described the invention, what is claimed as new and desired to be secured by Letters Patent is:

1. An ammunition vehicle having a door, a shield pivotally mounted on the door, and means for releasably fastening said shield upon the door in a position transverse thereto or longitudinally thereof.

2. An ammunition vehicle having a door, and a shield having a permanent connection with the door permitting of the shield being swung on the door from one position of use to another in a direction transverse to that in which the door swings.

3. An ammunition vehicle having a door, a shield normally forming the back of a seat for the serving crew, and connecting means between the shield and the door permitting of the shield being swung on the door to a position in which it enlarges the space covered by the door when the door is in its opened position.

4. An ammunition vehicle having a door, and a shield mounted to swing on the door about an axis at right angles to the plane of the door.

5. An ammunition vehicle, a tilting box, a door for the box, a shield normally forming the back of a seat for the serving crew, and connecting means between the door and the shield permitting of the shield being swung about an axis at right angles to the door to a position in which it enlarges the space covered by the box and the opened door when the box is in the tilted position.

6. A tilting ammunition vehicle having a door, a shield normally forming the back of a seat for the serving crew, a permanent connection between the shield and the door permitting the shield to be swung on the door to a position in which it enlarges the space covered by the door when the door is in the open tilted position, and means for securing the shield in its different positions on the door.

7. An ammunition vehicle having a door, a shield normally forming the back of a seat for the serving crew, a connection between the shield and the door permitting of the shield being swung on the door to a position in which it enlarges the space covered by the door when open, a locking means for the door, and a connection between the locking means and the shield whereby the shield normally holds said means in the locking position, and constructed to release the locking means when the shield is swung to its shielding position.

The foregoing specification signed at Düsseldorf, Germany, this 14th day of December, 1907.

WILHELM MAYER.

In presence of—
CLEMENS HECKMANN,
WILHELM FLASCHE.